(12) United States Patent
Sakashita

(10) Patent No.: US 7,609,880 B2
(45) Date of Patent: Oct. 27, 2009

(54) DISPLAY APPARATUS AND ITS CONTROL METHOD

(75) Inventor: Yukihiko Sakashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 751 days.

(21) Appl. No.: 11/329,033

(22) Filed: Jan. 11, 2006

(65) Prior Publication Data

US 2006/0158411 A1    Jul. 20, 2006

(30) Foreign Application Priority Data

Jan. 14, 2005   (JP)   ............................. 2005-007481
Dec. 26, 2005   (JP)   ............................. 2005-372527

(51) Int. Cl.
G06K 9/00    (2006.01)
G06K 9/38    (2006.01)
G06K 9/40    (2006.01)

(52) U.S. Cl. ........................ 382/162; 382/272; 382/274

(58) Field of Classification Search ................ 382/162, 382/164, 167, 272, 274; 358/1.12, 1.16, 358/501, 515, 518, 521, 523, 527; 345/89, 345/204, 211, 600–604, 690; 348/223.1, 348/655; 353/31, 121

See application file for complete search history.

(56) References Cited

U.S. PATENT DOCUMENTS

| | | | | |
|---|---|---|---|---|
| 3,918,803 | A | * | 11/1975 | Friesem ....................... 353/121 |
| 4,873,570 | A | * | 10/1989 | Suzuki et al. ................ 358/515 |
| 5,140,649 | A | * | 8/1992 | Kageyama ................... 382/167 |
| 5,309,258 | A | * | 5/1994 | Kouno et al. ................ 358/523 |
| 6,069,972 | A | * | 5/2000 | Durg et al. ................... 382/167 |
| 6,519,052 | B1 | * | 2/2003 | Oneda et al. ................ 358/1.16 |
| 6,592,227 | B2 | | 7/2003 | Ouchi et al. .................. 353/97 |
| 6,719,427 | B2 | | 4/2004 | Sakashita et al. .............. 353/31 |
| 6,727,943 | B1 | * | 4/2004 | Juen ......................... 348/223.1 |
| 6,891,524 | B2 | | 5/2005 | Sakashita ..................... 345/89 |
| 7,038,702 | B2 | * | 5/2006 | Kudo et al. ................. 345/690 |
| 2001/0017619 | A1 | | 8/2001 | Takeuchi .................... 345/204 |
| 2004/0032534 | A1 | * | 2/2004 | Fujino ........................ 348/655 |

(Continued)

FOREIGN PATENT DOCUMENTS

CN    1313982    9/2001

(Continued)

Primary Examiner—Amir Alavi
(74) Attorney, Agent, or Firm—Fitzpatrick, Cella, Harper & Scinto

(57) ABSTRACT

An image display apparatus includes a display device, and a signal processing circuit. In at least one case where an image is displayed by a first image signal which designates a first image having a first region of a predetermined color and a predetermined brightness, the first region has a first width in a predetermined direction, and in at least one case where an image is displayed by a second image signal which designates a second image, which is an image in which average luminance of an entire image is the same as that of the first image, having a second region of the predetermined color and the predetermined brightness, the second region has a second width larger than the first width in the predetermined direction. The brightness of the first region in the image which is displayed by the first image signal is brighter than that of the second region in the image which is displayed by the second image signal, by the signal processing in the signal processing circuit.

2 Claims, 6 Drawing Sheets

U.S. PATENT DOCUMENTS

2004/0125215 A1* 7/2004 Wallace .................. 348/223.1
2006/0158411 A1* 7/2006 Sakashita .................... 345/89

FOREIGN PATENT DOCUMENTS

| | | |
|---|---|---|
| EP | 1 117 088 | 7/2001 |
| JP | 2002-333858 | 11/2002 |
| JP | 2004-048185 | 2/2004 |

* cited by examiner

DISPLAY EXAMPLE
BEFORE CORRECTION
DISPLAY EXAMPLE
AFTER CORRECTION
FIG. 5A1
FIG. 5B1
FIG. 5A2
FIG. 5B2
FIG. 5A3
FIG. 5B3

DISPLAY EXAMPLE
BEFORE CORRECTION
DISPLAY EXAMPLE
AFTER CORRECTION
*FIG. 6A1*
*PRIOR ART*
*FIG. 6B1*
*PRIOR ART*
*FIG. 6A2*
*PRIOR ART*
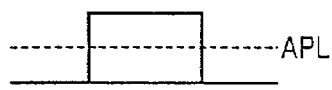
*FIG. 6B2*
*PRIOR ART*
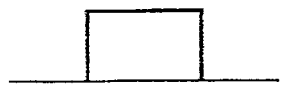
*FIG. 6A3*
*PRIOR ART*
*FIG. 6B3*
*PRIOR ART*

DISPLAY APPARATUS AND ITS CONTROL METHOD

BACKGROUND OF THE INVENTION

1. Field of the Invention

The invention relates to an image display apparatus in which picture quality of a display image is improved.

2. Related Background Art

Hitherto, there are the following techniques to display an image of a high contrast ratio in a limited dynamic range.

There is known a technique in which a whole display screen is divided into a plurality of regions and a video signal of each region is expanded independent of video signals of the other regions and gamma (g) is corrected on the basis of distribution of a luminance value of the video signal of the target region (for example, refer to JP-A No. 2004-048185).

There is also known a technique in which a dynamic range is changed in accordance with an average luminance level in order to realize white peak characteristics like a CRT (for example, refer to JP-A No. 2002-333858).

SUMMARY OF THE INVENTION

It is an object of the invention to realize an image display apparatus which can perform a preferable display or a manufacturing method of the image display apparatus. According to embodiments, which will be explained hereinafter, of the invention, constructional examples which can improve a contrast feeling, more specifically speaking, which can improve a brightness feeling of a specific color region are shown.

The following examples can be mentioned as specific examples which can be solved by the constructions of the embodiments, which will be explained hereinafter, of the invention.

For example, in the conventional methods mentioned above, according to the method whereby the region in the display screen is divided and the video signal of the target region is expanded independent of the video signals of the other regions and γ-corrected on the basis of the distribution of the luminance value of the video signal of the target region, although the contrast feeling is improved as compared with that in the case of γ-correcting in a lump in the whole display screen, in the divided regions, a gain is still suppressed to one of a plurality of white peaks. Thus, there is a problem of occurrence of a portion which lacks the contrast feeling.

According to the method whereby the dynamic range is changed in accordance with the average luminance level, since the gain is determined irrespective of an area, a width, and the like of the white peak, there is such a problem that the brightness feelings of white in a plurality of white peak portions are not adequately expressed.

One of the inventions regarding the invention is constructed as follows. That is, an image display apparatus for displaying an image on the basis of image data, comprising:

detection means for detecting a size of color region of a predetermined color on the basis of the image data; and conversion means for converting the image data of the color region in accordance with the size of the color region.

Another one of the inventions regarding the invention is constructed as follows. That is, an image display apparatus comprising:

a display device; and a signal processing circuit for performing a signal processing according to a size of region of a predetermined color in an image to be displayed.

The size of region of the color is not limited to an area of such a region but includes a size (width) in a predetermined direction. The processing according to the size of region is not limited to a construction in which a processing amount (correction amount) is made different in accordance with the size of region. For example, such a processing includes a construction in which although a specific processing is executed in the case of a predetermined size, the specific processing is not executed in the case of another size.

Still another one of the inventions regarding the invention is constructed as follows. That is, an image display apparatus comprising:

a display device; and a signal processing circuit, wherein (a) in at least one case where an image is displayed by a first image signal which designates a first image having a first region of a predetermined color and a predetermined brightness, the first region has a first width in a predetermined direction, and (b) in at least one case where an image is displayed by a second image signal which designates a second image, which is an image in which average luminance of a whole image is the same as that of the first image, having a second region of the predetermined color and the predetermined brightness, the second region has a second width larger than the first width in the predetermined direction, the brightness of the first region in the image which is displayed by the first image signal is brighter than that of the second region in the image which is displayed by the second image signal, by the signal processing in the signal processing circuit.

Preferably, the signal processing circuit has a conversion circuit for converting image data on the basis of a control value according to the number of continuous pixels of the predetermined color.

According to the invention, in the display apparatus such as CRT, LCD, PDP, or the like, the contrast feeling and the brightness feeling can be improved.

BRIEF DESCRIPTION OF THE DRAWINGS

FIGS. 5A1, 5A2, 5A3, 5B1, 5B2 and 5B3 are explanatory diagrams for explaining a white peak correcting method according to the first embodiment; and FIGS. 6A1, 6A2, 6A3, 6B1, 6B2 and 6B3 are explanatory diagrams for explaining conventional correcting methods.

DETAILED DESCRIPTION OF THE PREFERRED EMBODIMENTS

First Embodiment

Figure 1:
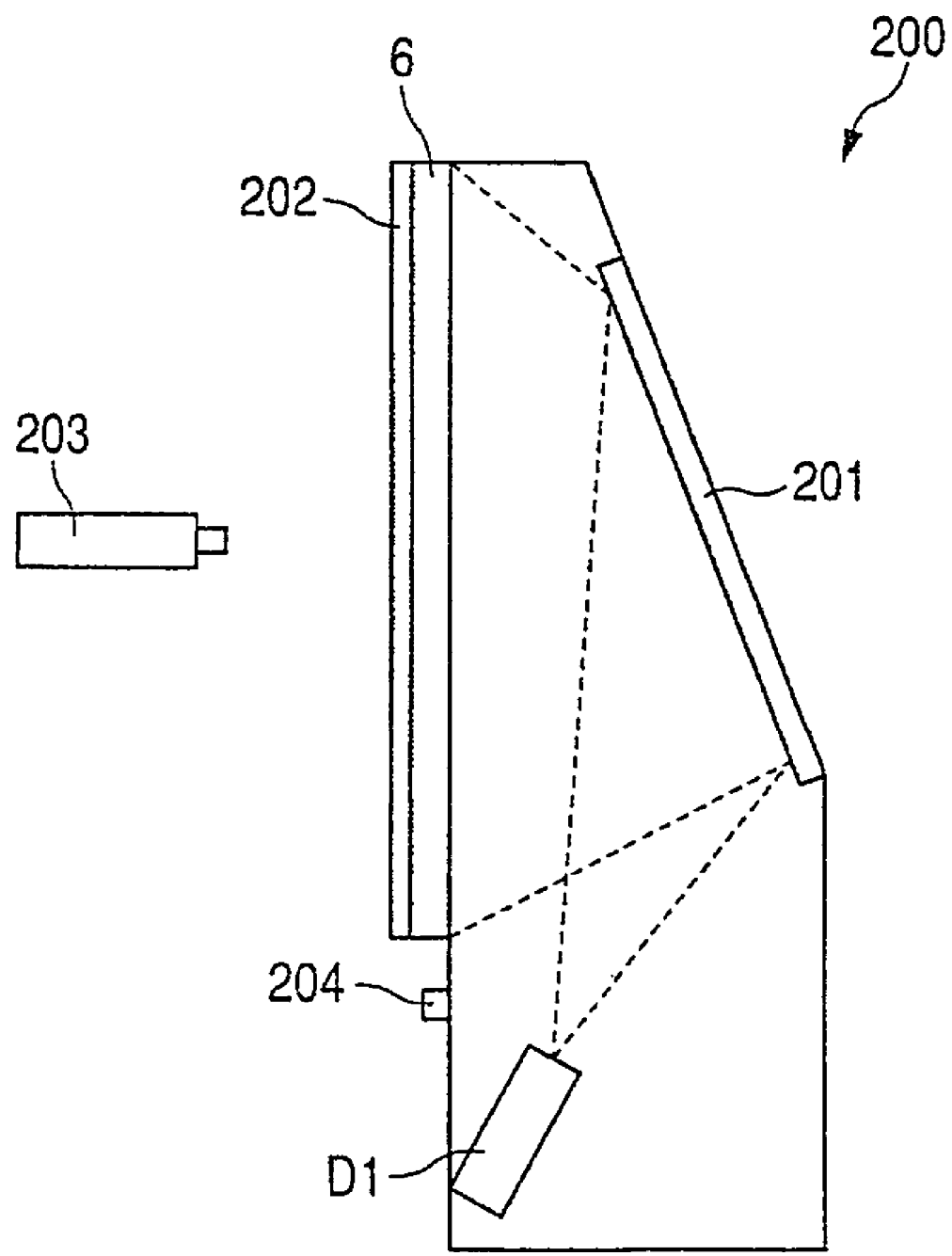
FIG. 1 is a diagram showing a rear projection type display apparatus according to the first embodiment of the invention.

FIG. 1 is a side elevational view of a rear projection type display apparatus 200 of the invention.

An image projected from a projection type display engine D1 is reflected by a reflecting mirror 201 and projected from a rear surface of a screen 6. A digitizer 202 is attached to a front surface of the screen 6. Position coordinates inputted by a pen 203 for the digitizer are inputted to the display apparatus 200 from the front surface of the screen 6. A digitizer of an optical type, a pressure sensitive type, an ultrasonic wave type, or the like can be used as a digitizer 202.

A brightness adjusting switch (SW) 204 is a switch to instruct the brightness of a display screen.

Figure 2:
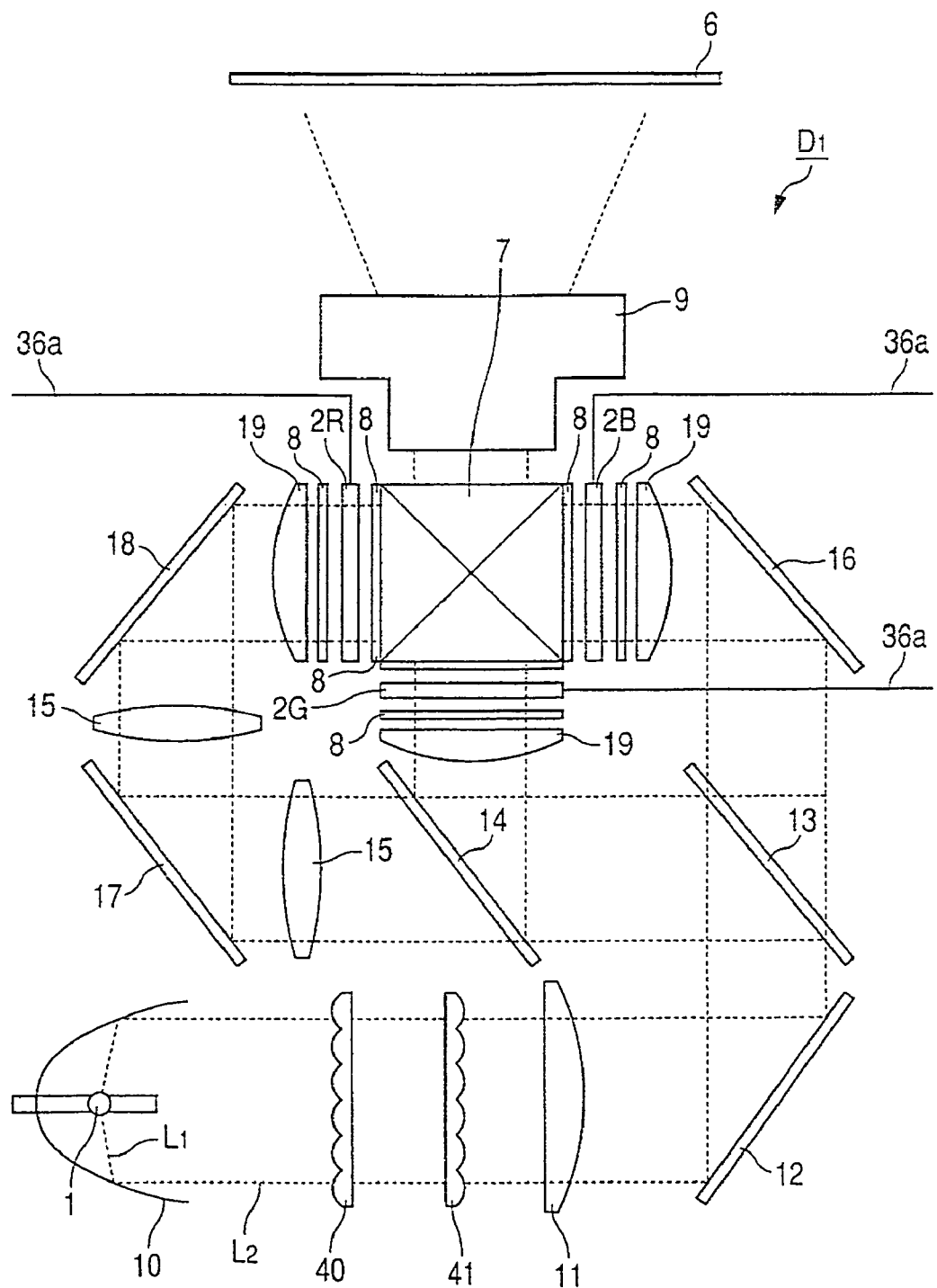
FIG. 2 is a diagram showing a projection type display engine according to the first embodiment.

According to the projection type display engine D1 in FIG. 2, three liquid crystal panels 2R, 2G, and 2B corresponding to color displays of R, G, and B are used as light modulating devices (display devices). The three liquid crystal panels 2R, 2G, and 2B are arranged at positions which face surfaces of a cross prism 7. The following panels can be used as liquid crystal panels 2R, 2G, and 2B: a TN (Twisted Nematic) type liquid crystal panels of an active matrix type which are driven by using TFTs; ferroelectric liquid crystal panels of the active matrix type which can execute the high-speed operation; OCB (Optically Compensated Bend) liquid crystal panels; or the like. Polarizing plates 8 are arranged on both sides of each of the liquid crystal panels 2R, 2G, and 2B so as to sandwich each panel, respectively. A projecting lens 9 and the screen (member to be projected) 6 are arranged on the light outgoing side of the cross prism 7.

A parabolic reflector 10 is arranged so as to surround a lamp (light source) 1, thereby allowing emission light from the lamp 1 to be converted into a parallel light beam. The reflector 10 is not limited to the parabolic shape but may be formed in an elliptic shape so as to convert the incident light into a converging light beam. A metal halide lamp, a xenon lamp, or the like can be used as a lamp 1.

Integrators 40 and 41 of the fly's eye are arranged on an optical path of the light emitted from the lamp 1 so as to have a conjugate relation with the liquid crystal panels 2R, 2G, and 2B and unevenness of the light source is improved.

A relay lens 11 and a mirror 12 are sequentially arranged on the light outgoing side of the fly's eye integrators 40 and 41. Further, two dichloic mirrors 13 and 14 are arranged, thereby branching the emission light from the lamp 1 into three kinds of light. A relay lens 15 and mirrors 16, 17, and 18 are arranged, thereby guiding the branched light to the liquid crystal panels 2R, 2G, and 2B, respectively. Reference numeral 19 denotes a field lens.

Figure 3:
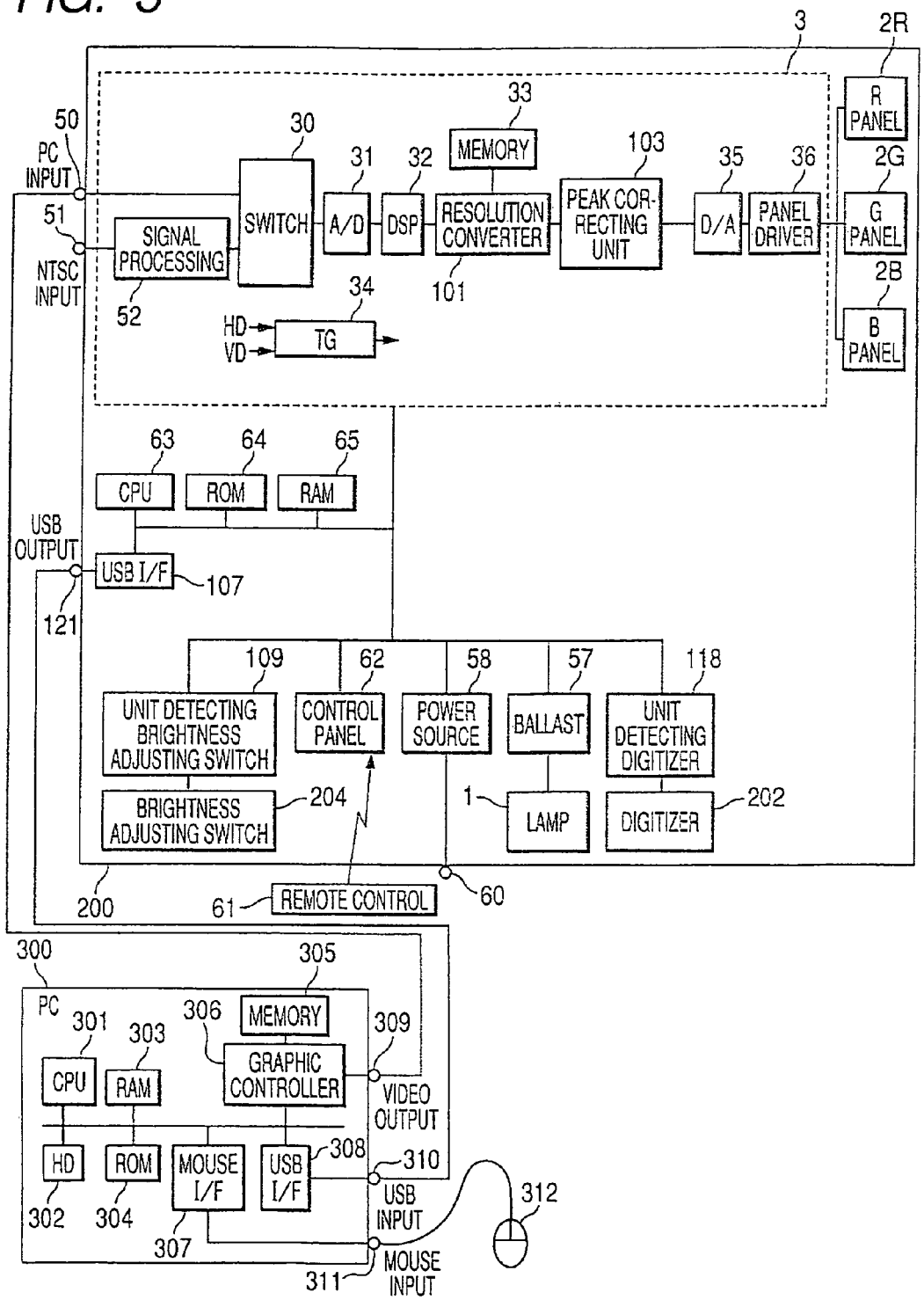
FIG. 3 is a block diagram of an image display apparatus according to the first embodiment.

Processes of an electric signal in the projection type display engine of the embodiment will now be described. FIG. 3 is a block diagram of the embodiment according to the invention.

A video signal which is outputted from a personal computer (PC) 300 and a television (TV) signal demodulated from a broadcasting wave are inputted to video signal processing means 3 through a PC input 50 and an NTSC input 51 and either the video signal or the TV signal is selected by a switch 30. The selected image signal is transmitted to a peak correcting unit 103 through an A/D converter 31, a DSP 32, and a resolution converter 101. A memory 33 stores present image data and image data of a next frame. The peak-corrected image data is converted into an analog signal by a D/A converter 35 and inputted to a panel driver 36. The panel driver 36 supplies driving signals based on the image data to the liquid crystal panels 2R, 2G, and 2B, respectively.

In the DSP unit 32, display image processes such as contrast adjustment, brightness adjustment, color conversion, and the like are executed.

Although only an analog input signal is shown in this block diagram, the invention is not limited to it but, naturally, the invention is also effectively applied to a construction in which an input terminal of LVDS, TMDS, or the like, a D4 terminal for a digital television, or the like is provided.

A signal processing circuit 52 executes signal processes such as decoding of the NTSC signal, noise reducing process, band limitation filtering, signal level adjustment, and the like.

A ballast 57 is a lamp power source connected to the lamp 1. A system power source 58 supplies an electric power to the whole system from an AC inlet 60. A remote control 61 is a device which is used for the user to execute various operations of the display apparatus. A control panel 62 receives a signal which is transmitted from the remote control 61.

A brightness adjusting switch detecting unit 109 detects the operation of the brightness adjusting switch 204. A digitizer detecting unit 118 detects the coordinates designated by the digitizer 202.

A CPU 63 is connected to the foregoing video signal processing means 3, control panel 62, ballast 57, brightness adjusting switch detecting unit 109, digitizer detecting unit 118, a USB I/F 107, and the like. The CPU 63 controls the driving of the liquid crystal panels 2R, 2G, and 2B, the lamp 1, and the like and executes processes such as enlargement, reduction, and movement of the display image.

Although the embodiment has been described on the assumption that the brightness adjusting switch detecting unit 109, digitizer detecting unit 118, USB I/F 107, and the like are connected to the CPU 63, they can be also constructed in such a manner that they are built in the CPU or executed by a program.

The PC 300 comprises: a CPU 301; an HD (hard disk) 302; a RAM 303; a ROM 304; a video memory 305; a graphic controller 306; a mouse I/F 307; a USB I/F 308; and the like. The PC 300 has a video output terminal 309, a USB input terminal 310, and a mouse input terminal 311. A mouse 312 is connected to the mouse input terminal 311.

A principle of the white peak correction according to the embodiment will now be described with reference to FIGS. 5 and 6.

FIGS. 6A1, 6A2, 6A3, 6B1, 6B2 and 6B3 show examples of conventional dynamic range improving correction. FIGS. 6A1, 6A2 and 6A3 show display examples before the correction. FIGS. 6B1, 6B2 and 6B3 show display examples after the correction corresponding to the display examples of FIGS. 6A1, 6A2 and 6A3. An axis of ordinate indicates display luminance and an axis of abscissa indicates a position in the horizontal direction. A broken line shows an average luminance level (APL) of each display example, as shown in the conventional examples of FIGS. 6A1, 6A2 and 6B3, in the case of executing a process to change the dynamic range of the display in accordance only with the average luminance, when the average luminance level is low as shown in FIG. 6A1, the contrast can be improved by increasing a gain of the white peak as shown in FIG. 6B1. On the contrary, when the average luminance level is high as shown in FIG. 6A2, the gain is not changed and the contrast can be improved in accordance with a size of white region. However, in the case of FIG. 6A3, since the average luminance is equal to that in FIG. 6A2, the contrast is not improved in spite of the white peak of a narrow region.

On the other hand, according to the invention, since the apparatus has the detection means for detecting the size of white region, a gradation is changed in accordance with the size of white region.

FIGS. 5A1, 5A2, 5A3, 5B1, 5B2 and 5B3 show examples of dynamic range improving correction according to the invention. FIGS. 5A1, 5A2 and 5A3 show display examples before the correction. FIGS. 5B1, 5B2 and 5B3 show display examples after the correction corresponding to the display examples of FIGS. 5A1, 5A2 and 5A3. When the white region is narrow as shown in FIGS. 5A1 and 5A3, a process for raising the gain of the white peak is executed irrespective of the average luminance level (APL). As shown in FIG. 5A2, when the white region is wide, the process in which the gain is not changed is executed in a manner similar to the conventional example.

Figure 4:
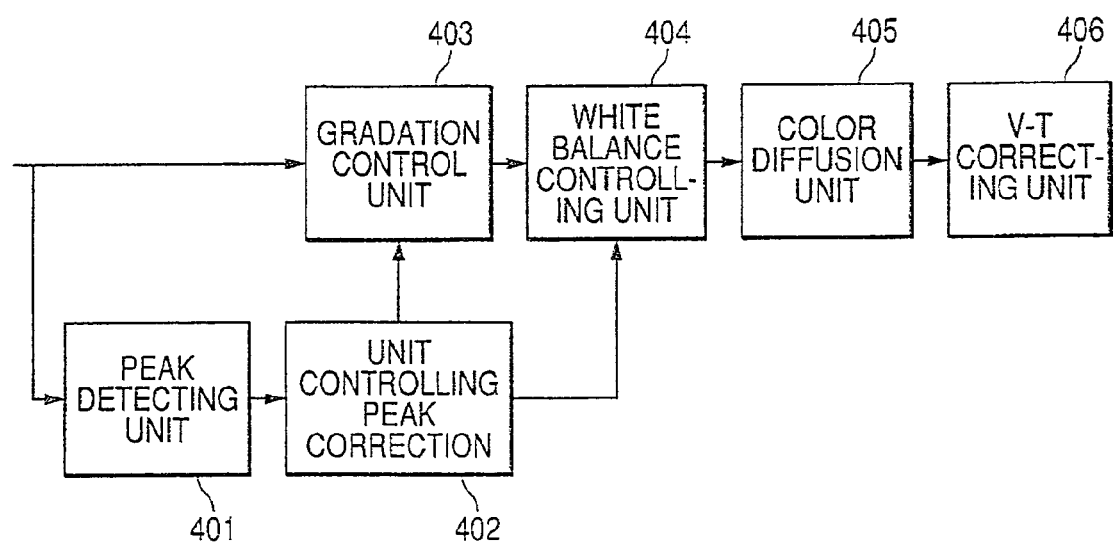
FIG. 4 is a signal processing block diagram including a white peak correcting unit according to the first embodiment.

FIG. 4 is a block diagram showing details of the white peak correcting unit 103.

A peak detecting unit 401 detects the white peak from a threshold value and an area of white region. The threshold value is determined from a histogram of the image data to be displayed or an average luminance.

A peak correction control unit 402 controls a gradation control unit 403 and a white balance controlling unit 404 in accordance with the size of white portion detected by the peak detecting unit 401.

The gradation control unit 403 converts the image data so as to increase the image data of the white peak portion determined to be the white peak by the peak detecting unit 401 in accordance with the magnitude of the white peak.

If the luminance has already reached the maximum value, display luminance is further raised by changing the white balance by the white balance controlling unit 404. In a color diffusion unit 405, when the white balance is changed from a predetermined white balance by the white balance controlling unit 404, the color corresponding to the shift amount from the predetermined white balance is diffused to a peripheral region.

In a V-T correcting unit 406, correction of a V-T curve is made in accordance with the characteristics of the liquid crystal panels.

Explanation will be made in detail hereinbelow.

The peak detecting unit 401 detects a ratio of the video signals R, G, and B of each of the inputted pixels, there by discriminating whether or not the color of the pixel is an achromatic color. In this example, the pixel which is formed by the signals R, G, and B whose ratio is equal to or less than 5% (in other words, a difference between a value of the signal having the maximum value and a value of the signal having the minimum value among the signals R, G, and B to form one pixel is equal to or less than 5% of the maximum value) is handled as an achromatic pixel. Subsequently, whether or not the signal of the pixel determined to be achromatic becomes a target to be subjected to the white peak process is decided. A luminance level is compared with the average luminance level (APL) of the input video signal and the pixel whose luminance level is higher than the APL is set to the target pixel of the white peak process. That is, among the achromatic pixels, the pixel whose luminance level is higher than the APL is handled as a pixel of a predetermined color (white in this embodiment). The number of continuous target pixels of the white peak process is counted. The white peak process is controlled in accordance with a count value indicative of the size of white region.

In the embodiment, the white peak process is executed when a count number Kw of the white peak target pixels is equal to or less than 20. Assuming that the luminance level of white is increased by 10% when Kw=1 and it is set to the value of 1 time when Kw=21, arithmetic operations for the white peak process are as follows.

$Rout=\{1+f(Kw)\} \cdot Rin$ $Gout=\{1+f(Kw)\} \cdot Gin$ $Bout=\{1+f(Kw)\} \cdot Bin$ where $f(Kw)=(20-(Kw-1))/200$ $\{1+f(Kw)\}$ denotes a gain In the embodiment, the luminance level has been set in such a manner that a white peak increase amount changes linearly when the count number Kw of the white peak target pixels is equal to or less than 20. However, by changing the above function f(Kw) in accordance with the characteristics of the display device or a video scene to be displayed, the white peak correction which is optimum to the display device or the video scene can be made. Although the value of 20 pixels has been used here as a threshold value which is used to discriminate whether or not the peak process is executed, such a value can be properly set. A value which is equal to or less than 5% of the total number of pixels in a predetermined direction (horizontal direction here) is preferably used. In this constructional example, kw is inputted as a control value into an arithmetic operating circuit for the white peak process. When the count value is equal to or larger than 22, the foregoing correcting process is not executed in the arithmetic operating circuit for the white peak process. Particularly, in this embodiment, the apparatus is constructed so that a degree of correction can be adjusted in accordance with the count value Kw. It is also possible to construct the apparatus in such a manner that the control value is generated only either in the case where the count value (for example, 1 or 0) is equal to or less than (is less than) a predetermined value or in the case where it is larger than the predetermined value (is equal to or larger than the predetermined value) or and the uniform correction is made in accordance with the presence or absence of the control value.

The embodiment has been described with respect to the example in which the number of white pixels in the horizontal direction is counted and the white peak correction is made. By this method, the correction according to the size (width) of white region in the horizontal direction can be made. Specifically speaking, the following control can be made with respect to the case where the first and second images whose APLs are set to the same value. The following case is mentioned here as an example: the first image has a region which is a white region to be displayed at the predetermined luminance and in which the width in the horizontal direction is equal to or less than a predetermined width (20 pixels here) and the second image has a region which is a white region to be displayed at the same luminance as the predetermined luminance and in which the width in the horizontal direction is larger than the predetermined width. In the image actually displayed in this instance, the luminance is controlled so that the luminance of the region of the first image is brighter than that of the region of the second image. An expression that one luminance is brighter than the other one denotes a relative relation. That is, by controlling so that the luminance of the region of the second image is darkened, control can be made so that the luminance of the region of the first image is felt bright as a relative feeling.

By providing a plurality of line memories and counting the number of pixels in the vertical direction, the white peak correction in the vertical direction can be made.

By deciding the size of white region on the basis of the count number of the white peak pixels in the horizontal direction and the count number of the white peak pixels in the vertical direction and by determining the white peak correction amount on the basis of the size of white region obtained two-dimensionally, the white peak correction can be made more effectively.

The operation of the white balance controlling unit 404 and the color diffusion unit 405 will now be described.

Generally, in many display apparatuses, the white balance can be changed. There is a display apparatus which can change a color temperature to a value within a range from a low color temperature of about 6500° to a high color temperature of about 9500°. Further, there is a display apparatus in which the user can adjust the color temperature every 500°, or the like.

The adjustment of the color temperature is made by changing the gain of the signal level which is given to each of the RGB panels.

For example, when R:G:B=1:1:1 at 6500°, since it is necessary to set a hue to be bluish in order to obtain 9500°, by reducing the gains of R and G, the ratio (R:G:B) is changed to R:G:B=8:8:10.

Therefore, since the gains of R and G are reduced, the luminance is lower than that in the case where the image signals of R and G of 100% are outputted. Accordingly, if the white balance has been adjusted, the luminance of the display apparatus is set to be lower than the luminance which can be inherently displayed.

The display apparatus which can output the maximum luminance when the pixel values are equal to (R, G, B)=(100, 100, 100) are adjusted to (R, G, B)=(80, 80, 100) in a gain control unit in order to adjust the white balance. If each of the RGB signals is increased by 10% in the white peak state, (R, G, B)=(88, 88, 100) and the pixel value of B is maximum, so that the luminance cannot be raised. Therefore, the white balance is deviated from the set value.

When the white peak exists in a small region, it is difficult to perceive a color drift. However, if there are a plurality of white peaks or if a deviation amount of the white balance is large, there is also a case where a problem occurs.

Therefore, by diffusing the deviation amount of the white balance to the peripheral pixels by the color diffusion unit 405, the white balances of a plurality of pixel regions are equalized. In the above embodiment, since each of the R and G pixel values is deviated by 8, the values obtained by subtracting 2 from each of the four upper, lower, right, and left pixels are displayed, thereby substantially equalizing the white balances of a plurality of pixel regions.

Consequently, the white peak of the brightness higher than the luminance restricted by the white balance and the display apparatus of higher picture quality can be provided.

Second Embodiment

The example in which the white region is detected and the white peak process is executed has been shown in the embodiment 1. The second embodiment will now be described with respect to a method whereby the peak process of a predetermined specific color is executed and a clear image is obtained.

In many projection type display apparatuses, generally, importance is attached to light using efficiency and a high pressure mercury lamp is used as a light source. However, the high pressure mercury lamp has such a tendency that the luminance of the red region is low due to spectrum characteristics of the lamp.

Therefore, hitherto, for example, an amount of transmission light is increased by widening a cutting wavelength of a filter of the dichloic mirror 14 for red color separation. However, although the luminance of red increases, purity of chromaticity of red deteriorates and a color gamut is narrowed.

According to the invention, by detecting the size of red region and executing the peak correcting process in accordance with this size, the clear image can be displayed even in the red region without narrowing the color gamut of red like conventional apparatus.

The peak process for red in the embodiment will now be described with reference to FIGS. 3 and 4 again. It differs from the first embodiment with respect to a point that the peak correcting unit 103, peak detecting unit 401, and peak correction control unit 402 execute the peak correcting process to red as a predetermined color.

The peak detecting unit 401 detects the ratio of the R, G, and B signals of the input video signal, thereby discriminating whether or not the signal is red. In this embodiment, the signal in which each of the G and B signals is equal to or less than 5% of the R signal is determined to be red. Subsequently, whether or not the peak process is executed to the signal determined to be red is discriminated. For this purpose, the number of continuous peak process target pixels of red is counted and the peak process is controlled in accordance with a count value.

In the embodiment, the peak process is executed when a count number Kr of the peak target pixels of red is equal to or less than 20. Assuming that the red luminance is increased by 10% when Kr=1 and is set to the value of 1 time when Kr=21, $Rout=\{1+f(Kr)\} \cdot Rin$ $Gout=Gin$ $Bout=Bin$ where $f(Kr)=(20-(Kr-1))/200$ $\{1+f(Kr)\}$ denotes a gain In a manner similar to the first embodiment, according to the second embodiment, the apparatus is set in such a manner that when the count number Kr of the peak target pixels of red is equal to or less than 20, an increase amount of the red peak linearly changes. However, by changing a function f(Kr) in the equation in accordance with the characteristics of the display device or the video scene to be displayed, the red peak correction which is optimum to the display device or the video scene can be made.

Also in this embodiment, with respect to the deciding method of the size of red region and the white balance adjusting method, methods similar to those in the first embodiment can be used.

For example, the image signal whose pixel values are equal to (R, G, B)=(80, 0, 0) is determined to be a red peak correction target image. Assuming that the R signal is increased by 10%, (R, G, B)=(88, 0, 0) and the white balance controlling unit 404 is adjusted so as to output the R signal exceeding the restriction value due to the white balance.

In the case where the pixel values have been adjusted so that (R, G, B)=(100, 80, 80) are set to the maximum value by the white balance, if the R signal (R, G, B)=(100, 0, 0) is inputted, since the value of R is the maximum value, the luminance of R cannot be increased. In this manner, when the R signal has the maximum value, the peak correcting process for increasing the luminance of red by increasing the G or B signal and, for example, by increasing each of the G and B signals by 5% like (R, G, B)=(100, 5, 5) is executed.

Such a process is executed by using human sensory characteristics in which it is difficult to perceive the color drift because the red peak exists in the small region.

Consequently, the red peak of the brightness which is equal to or higher than the luminance restricted by the white balance can be expressed and the display apparatus of a clear image of high picture quality can be provided.

As described above, in the invention, by changing the image data of the red region in accordance with the size of red region, the lack of contrast feeling of red and the lack of brightness feeling which are caused by the lack of luminance of red as a problem mentioned above can be also corrected. Further, the display apparatus which can display a clear image of high picture quality can be provided.

Although the example in which the peak process is executed to red has been described in the embodiment, naturally, the invention can be also applied to another color.

This application claims priority from Japanese Patent Application Nos. 2005-007481 filed on Jan. 14, 2005 and 2005-372527 filed on Dec. 26, 2005, which are hereby incorporated by reference herein.

What is claimed is:

1. An image display apparatus comprising:
a display device; and
a signal processing circuit,
wherein
(a) in at least one case where an image is displayed by a first image signal which designates a first image having a first region of a predetermined color and a predetermined brightness, the first region has a first width in a predetermined direction, and
(b) in at least one case where an image is displayed by a second image signal which designates a second image, which is an image in which average luminance of an entire image is the same as that of said first image, having a second region of the predetermined color and the predetermined brightness, the second region has a second width larger than the first width in the predetermined direction,
the brightness of said first region in said image which is displayed by said first image signal is brighter than that of said second region in said image which is displayed by said second image signal, by the signal processing in said signal processing circuit.

2. An apparatus according to claim 1, further comprising a converting circuit for converting image data on the basis of a control value according to the number of pixels of said predetermined color which are continuous in said predetermined direction.

* * * * *